United States Patent
Jain et al.

(10) Patent No.: US 6,799,782 B2
(45) Date of Patent: Oct. 5, 2004

(54) SPLASH AND SPRAY SUPPRESSOR

(75) Inventors: Sunil K. Jain, Fort Wayne, IN (US); David J. Beigel, Kettering, OH (US); L. David Allendorph, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 71 days.

(21) Appl. No.: 10/214,971

(22) Filed: Aug. 8, 2002

(65) Prior Publication Data

US 2004/0026914 A1 Feb. 12, 2004

(51) Int. Cl.7 .............................................. B62D 25/18
(52) U.S. Cl. ...................... 280/848; 280/847; 280/851
(58) Field of Search ............................... 280/848, 847, 280/849, 850, 851

(56) References Cited

U.S. PATENT DOCUMENTS

| 3,337,238 | A | | 8/1967 | Weasel, Jr. | |
| 3,341,222 | A | | 9/1967 | Roberts | |
| 3,834,732 | A | | 9/1974 | Schons | |
| 4,205,861 | A | | 6/1980 | Roberts et al. | |
| 4,334,694 | A | * | 6/1982 | Iwanicki | 280/851 |
| 4,436,319 | A | | 3/1984 | Clutter | |
| 5,207,455 | A | * | 5/1993 | Gotz et al. | 280/848 |
| 5,277,444 | A | * | 1/1994 | Stropkay | 280/848 |
| 5,299,831 | A | | 4/1994 | Schmidt | |
| 5,326,135 | A | * | 7/1994 | Nakayama et al. | 280/850 |
| 5,460,411 | A | * | 10/1995 | Becker | 280/851 |
| 5,462,331 | A | * | 10/1995 | Stief et al. | 296/198 |
| 5,564,750 | A | * | 10/1996 | Bajorek et al. | 280/851 |
| 5,961,148 | A | * | 10/1999 | Cheng | 280/851 |
| 6,364,358 | B1 | * | 4/2002 | Miller | 280/784 |
| 2002/0109347 | A1 | * | 8/2002 | Sheppard | 280/851 |

FOREIGN PATENT DOCUMENTS

| DE | 3637453 A1 | * | 4/1987 | ............ B62D/25/18 |
| DE | 3939937 A1 | * | 2/1991 | ............ B62D/25/18 |
| DE | 0523458 A1 | * | 1/1993 | ............ B62D/25/16 |
| FI | WO 93/12966 | * | 7/1993 | ............ B62D/25/16 |
| GB | 2078181 A | * | 1/1982 | ............ B62J/15/04 |
| GB | 0112694 A1 | * | 7/1984 | ............ B62D/25/18 |
| GB | 2229689 A | * | 10/1990 | ............ B62D/25/18 |
| JP | 0528410 A1 | * | 2/1993 | ............ B62D/25/16 |
| JP | 6-72356 | * | 6/1994 | ............ B62D/25/18 |

* cited by examiner

*Primary Examiner*—Brian L. Johnson
*Assistant Examiner*—J. Allen Shriver
(74) *Attorney, Agent, or Firm*—Jeffrey P. Calfa; Dennis Kelly Sullivan; Susan L. Lukasik

(57) ABSTRACT

The invention is a splash and spray suppressor for a wheeled motor vehicle, especially for trucks. The splash and spray suppressor includes a wheel panel nested within the fender. Apertures in the wheel panel allow water droplets to flow into the gap between the wheel panel and the fender. Droplets then flow within the gap toward an opening from where the droplets are drained from the splash and spray suppressor.

12 Claims, 3 Drawing Sheets

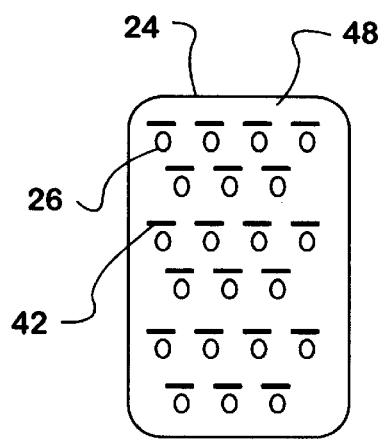
FIG. 9
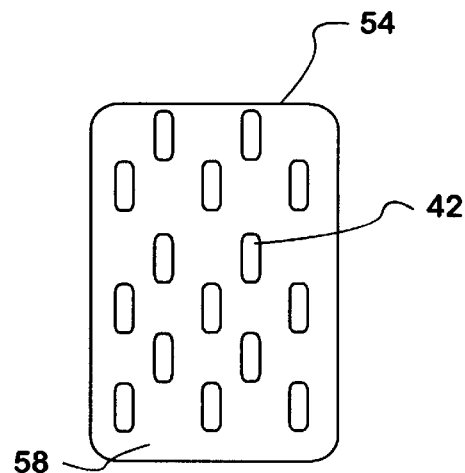
FIG. 10
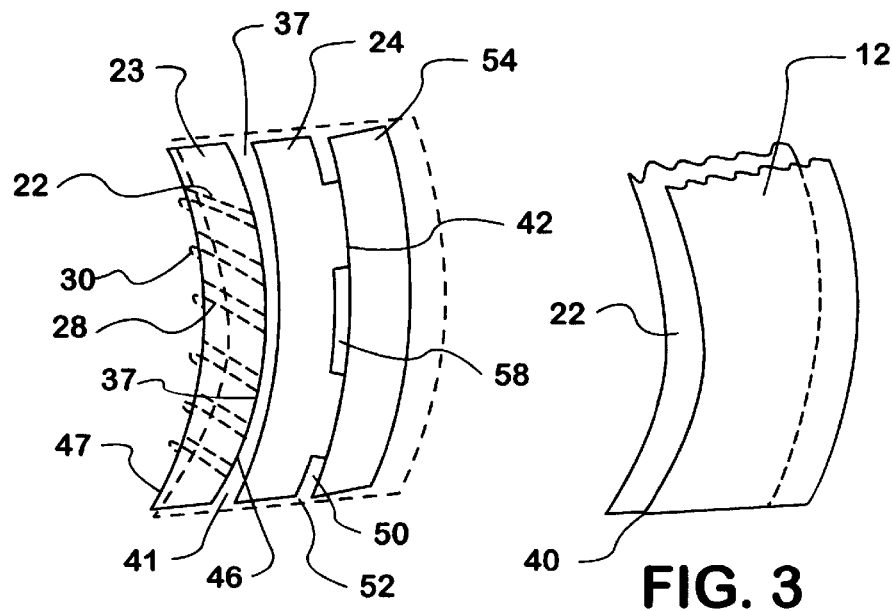
FIG. 6
FIG. 3

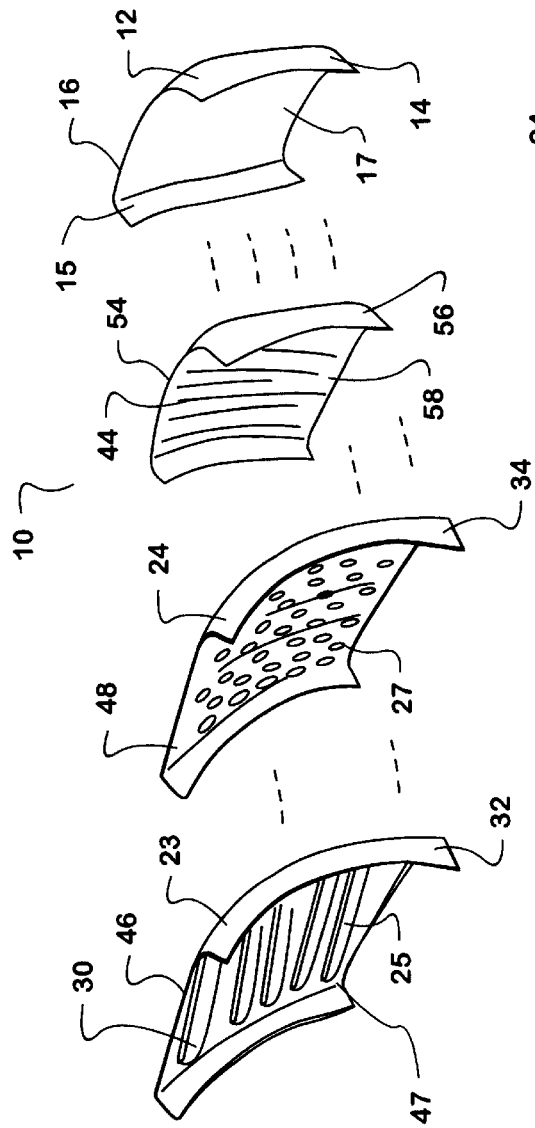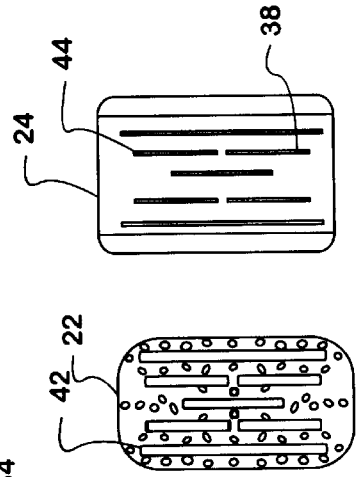

SPLASH AND SPRAY SUPPRESSOR

BACKGROUND OF THE INVENTION

1. Field of the Invention

The present invention relates to a splash and spray suppressor for motor vehicles.

2. Description of the Prior Art

During a thunderstorm or a cloud burst, rainwater falls to the road where the water pools or collects in indentations, tire tracks and channels in the road surface. This pooled water is dangerous, as it can allow hydroplaning of motor vehicles.

Equally dangerous is the spray of water from the roadway splashing motor vehicles. The motor vehicles generate clouds of spray beside or behind the vehicle as they drive down the road. The tire tread of the rotating tires contacts the road surface to lift the water and flings the water onto the fender. Alot of the splashed water ricochets off the fender back onto the tire, while some water ricochets laterally out of the well. Some of the splashed water droplets collide with other water droplets to break apart and atomize into a fine spray. This fine spray produces a fog flowing laterally from the well to decrease visibility. Spray may also include other objects on the road, such as ice, salt, pebbles and dust.

Spray produced by smaller motor vehicles, such as cars, may drench nearby pedestrians but is unlikely to be thrown onto the windshield to blind another driver. The spray produced from a large truck's tires, however, is thrown at windshield level of smaller vehicles. This spray can blind the driver of a passing or trailing car. Because a large truck passing at highway speeds can pull and push the small vehicle sideways on the road, the blinded driver can lose his orientation on the road, as well as lose his control of the vehicle. This loss of control can result in a wreck.

To reduce dangerous spray, various splash guards and fenders have been proposed. While these splash guards address some of the problems of splash and spray by motor vehicles, none of them adequately and efficiently protect other motor vehicles from excessive water spray.

Many prior devices use extensive enclosures of the wheel well. While they reduce spray, these enclosures cause other problems. These enclosures are located outside the fenders which may increase drag on the vehicle. This increased drag decreases the vehicle's mileage.

In addition, by substantially enclosing the wheel well, these enclosures trap heat within the well. This additional heat allows the tires to overheat, which reduces the life of the tire and can contribute to reduced handling of the vehicle.

Additional heat trapped within the well also heats the brakes. Overheated brakes are prone to reduced braking efficiency or even failure. Reduced braking efficiency and brake failure can have lethal results, especially with a heavy truck. A reduced ability to brake increases the braking distance required to come to a stop. A vehicle with brake failure cannot use the brakes to stop. Both conditions can lead to serious wrecks, many of which will be deadly.

Most of the prior devices require additional hardware and frames installed within the wheel well to attach the device to the vehicle. With the tight tolerances found in modern streamlined vehicles, such as the heavy duty trucks, there is little if any extra space between the tire and fender to attach such a device. These devices, therefore, cannot be used in these streamlined trucks.

Therefore, it is one object of the invention to provide a device to reduce splash and spray from the wheel well. Another object of the invention is to provide a device that reduces splash and spray but does not cause the tires to overheat. Still another object of the invention is to provide a device that can be used in the limited space between the fender and the tire within the wheel well.

SUMMARY OF THE INVENTION

According to the invention, there is provided a splash and spray suppressor for a wheeled motor vehicle, especially for trucks. The splash and spray suppressor reduces splash and spray from the wheel well in the lateral direction while allowing fluid to drain. The vehicle's fender has an arched wall and an outer sidewall that extends radially from the arched wall toward one of the vehicle's wheels. The arched wall and outer sidewall define a wheel well.

The splash and spray suppressor also has at least one arched panel fitting within the fender. In one embodiment of the invention, this arched panel is a wheel panel. The wheel panel has a plurality of apertures. The wheel panel is spaced from the fender to form a gap in fluid communication with the apertures. The wheel panel preferably attaches to the fender in a manner to reduce spray in the lateral direction while leaving an opening to allow fluid to drain from the splash and spray suppressor. The opening is in fluid communication with the gap.

In another embodiment of the invention, there is a second arched panel or the inner panel. While the inner panel fits between the wheel panel and the fender, the inner panel is spaced from the wheel panel to form a gap between the inner panel and the wheel panel. This gap is in fluid communication with the apertures. The inner panel preferably attaches to the wheel panel in a manner to reduce spray in the lateral direction while leaving an opening to allow fluid to drain from the splash and spray suppressor. This opening is in fluid communication with the gap and is located between the inner panel and the wheel panel.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a partial side view of a wheel panel and fender of the invention;

FIG. 4 is a exploded partial perspective view of one embodiment of the invention;

FIG. 6 is a side plan view of the invention with the fender and aperture walls in the wheel panel shown in phantom lines;

FIG. 7 is a rear plan view of a wheel panel of the invention;

FIG. 8 is a front plan view of an inner panel of the invention;

FIG. 9 is a rear plan view of an inner panel of the invention; and

FIG. 10 is a front plan view of a fender panel of the invention.

DETAILED DESCRIPTION OF THE INVENTION

Figures 2, 5:
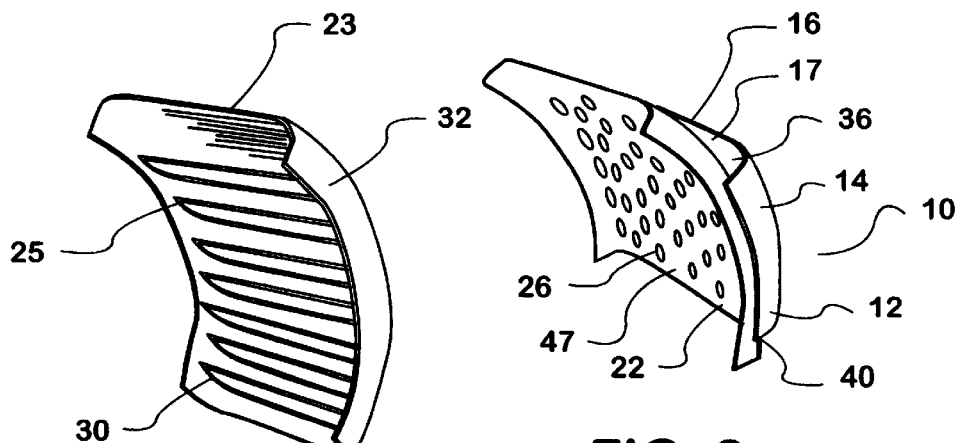
FIG. 2 is a partial perspective view of a wheel panel and fender of the invention.
FIG. 5 is a partial perspective view of a wheel panel of the invention.
Figure 1:
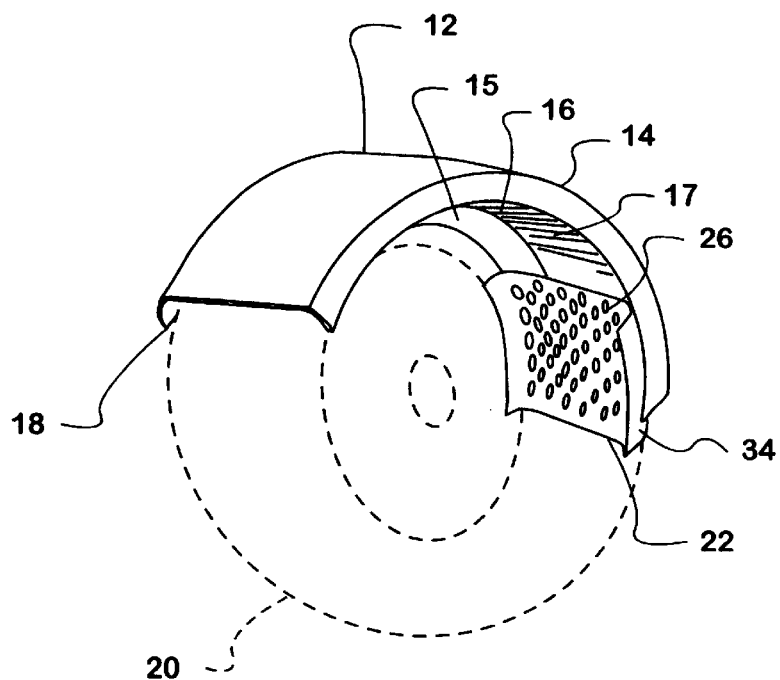
FIG. 1 is a partial perspective view of one embodiment of the invention with the tire in phantom lines.

Turning to the figures, where like reference numerals refer to like structures, the splash and spray suppressor is designed for a wheeled motor vehicle, especially for trucks. Turning to FIGS. 1–3, the splash and spray suppressor 10 uses fender 12 with arched wall 16 and outer sidewall 14 that define wheel well 18. Arched wall 16 has inner wall 17. Outer sidewall 14 extends radially from arched wall 16 toward one of the vehicle's wheels 20. If desired, inner sidewall 15 can also extend radially from arched wall 16 toward one of the vehicle's wheels 20.

Fitting directly within fender 12 and outer sidewall 14 is at least one arched panel, such as wheel panel 22 with a plurality of apertures 26. The panel apertures can be circular, oval (FIG. 1), oblong, rectangular, slits (FIGS. 4 and 5), and the like. Aperture walls 28 can be horizontal or parallel to the ground (not shown) and extend from the inner face 46 to the outer face 47 of the panel. Alternatively, aperture walls 28 can angle (FIG. 6) to help trap and channel fluid droplets away from the aperture. The addition of angled deflector 30 shown in the embodiment in FIG. 5 extending radially from wheel panel 23 toward wheel 20, especially around the apertures, can deflect droplets into the aperture and reduce the reflection of the droplets out of the apertures.

Gap 36 is located between wheel panel 22 and fender 12. Gap 36 is in fluid communication with apertures 26 and first opening 40. Droplets pass through apertures 26 and into gap 36 where the droplets fall out of opening 40.

Additional arched panels can nest between wheel panel 22 and fender 12. Inner panel 24, for example, can nest between the wheel panel and fender (not shown). Or in the configuration shown in FIGS. 4 and 7, inner panel 24 nests between wheel panel 23 and fender panel 54 which is adjacent to fender 12.

The arched panels can have arched projections extending radially toward the wheel at the sides, such as rim 32 of wheel panel 22 or 23, side portion 34 of inner panel 24 and arched flange 56 of fender panel 54. Side portion 34, for example, fits between rim 32 and outer sidewall 14 or arched flange 56, while arched flange 56 fits between side portion 34 and outer sidewall 14.

The arched panels can also have a plurality of apertures, such as apertures 27 in inner panel 24. As shown in FIG. 4, wheel panel 23 has a plurality of apertures 25 and inner panel 24 has a plurality of smaller apertures 27. This series of apertures allows some sieving of droplets. A larger droplet can enter the splash and spray suppressor through the larger aperture 25, yet break apart when hitting the edge of smaller aperture 27. Some of the droplet will go through the aperture, the rest will disperse on the side and flow downward toward the opening to drain out of the suppressor.

Gaps are located between the panels and are in fluid communication with the panel apertures. Gap 37, for example, is between wheel panel 22 and inner panel 24 and in fluid communication with apertures 25 and opening 41. Droplets pass through apertures 25 and into gap 37 where some of the droplets fall toward the ground and out of opening 41. Other droplets within gap 37 will enter apertures 27 and flow into gap 50 between inner panel 24 and fender panel 54.

Channels can be located within the gaps to direct the flow of fluid toward the openings to drain out. These channels are therefore in fluid communication with panel apertures and the openings. For example, channels can form between radial ridges 42 extending into gap 37 from the inner face 46 of wheel panel 22 and/or the wheel face 48 of inner panel 24. Alternatively, channels 38 can also be grooves 44 within inner face 46 of wheel panel and/or wheel face 48 of inner panel or can be located between grooves 44. Likewise, channels can also be formed in the fender face 49 of inner panel 24 and/or inner face 58 of fender panel 54.

Panels attach to other panels or the fender in a manner to reduce spray in the lateral direction while leaving openings at the bottom for drainage. Inner panel 24, for example attaches to wheel panel 23 while leaving opening 41 to allow fluid to drain from the splash and spray suppressor 10.

Because the panels are nested within the fender and each other, the panels can be attached together in a number of ways. The panels can matingly engage grooves in one panel with ridges on the opposite panel. Such engagement helps to align and assemble the panels in the correct position and keep the panels aligned. This mating engagement can also help form channels for fluid drainage. To decrease bulk, the panels may nest together without using radially extending side projections.

Typically, the panels are fastened together by any fastening means known in the art, such as pinning, screwing, bolting, and the like, although chemically bonding the panels together is preferred. Likewise, the panels can also mount to the fender by any mounting means known in the art, such as pinning, screwing, bolting, chemically bonding, and the like.

While the panels can be made from metal, the panels can also be made from plastic. The surface of the panels can be wettable, such as by using a hydrophilic plastic or coating. This wettable surface allows the droplets to flatten out on impact rather than beading up to form tight ball-like droplets. The flattened droplets are less energetic and are less likely to reflect back toward the tire. The flattened droplets are also more likely to flow down the surface of the panel. Some of the flattened droplets will flow into an aperture to be drained away.

The splash and spray suppressor of the invention can reduce the momentum or energy of the droplet. The hard metallic surface of the fender, for example, allows the droplets to reflect back toward the tire without much loss of momentum or energy. These energetic reflected droplets collide with freshly collected droplets. The droplets can break apart and collide with other droplets to form still smaller droplets, resulting in atomization and fog.

If one of the surfaces, such as the wheel panel is soft, the soft surface absorbs some of the energy from the droplets. This loss of energy has a dampening effect on the droplet to reduce the momentum of the reflected droplet. This in turn changes the angle of reflection downward and reduces the number of energetic droplets available to collide with freshly collected droplets.

The splash and spray suppressor of the invention traps droplets and prevents them from reflecting back to collide with freshly collected droplets. This results in fewer collisions between the droplets. With fewer collisions, the droplets are less likely to break apart or atomize and produce fog. The collected droplets are also channeled to drain toward the ground, away from the windshield of nearby vehicles.

If the panels of the splash and spray suppressor are designed to act like a sieve, the outer panels will collect the larger droplets while the inner panels collect the smaller droplets. The more energetic smaller droplets will be more likely to be trapped within the inner gap and drained away.

The splash and spray suppressor of the invention is streamlined. It fits within a fender without using additional mounting hardware, such as laterally extending rods. The suppressor also does not cover the wheel well and therefore does not lead to overheating of the tire and brakes.

While the invention is shown in only one of its forms, it is not thus limited but is susceptible to various changes and modifications without departing from the spirit and scope of the invention.

What is claimed is:

1. A splash and spray suppressor for a wheeled motor vehicle comprising:
    a fender having an arched wall and an outer sidewall ending radially from the arched wall toward a wheel, the arched wall and outer side all defining a wheel well;
    an arched wheel panel having a plurality apertures, the wheel panel being located within and attached to the fender;
    a gap in fluid communication with the apertures, the gap being located between the wheel panel and the fender;
    an opening in fluid communication with the gap, the opening being located between the wheel panel and the fender and allowing fluid drainage from the splash and spray suppressor;
    an angled deflector extending radially from the wheel panel toward the wheel;
    an arched inner panel fitting between the wheel panel and the fender;
    the inner panel attaching to the wheel panel and sealing the wheel panel;
    wherein the gap is located between the inner panel and the wheel panel; and
    wherein the opening is located between the inner panel and the wheel panel.

2. A splash and spray suppressor for a wheeled motor vehicle of claim 1, further comprising:
    apertures in the inner panel;
    a second gap in fluid communication with the apertures in the wheel panel and inner panel and being located between the inner panel and the fender; and
    a second opening in fluid communication with the second gap and allowing fluid drainage from the splash and spray suppressor.

3. A splash and spray suppressor for a wheeled motor vehicle of claim 1, further comprising:
    an arched fender panel extending radially toward the tire, the fender panel being located between the inner panel and the fender and being mounted to the fender.

4. A splash and spray suppressor for a wheeled motor vehicle of claim 1, further comprising:
    channels being located within at least one gap and in fluid communication with the apertures and one of the openings.

5. A splash and spray suppressor for a wheeled motor vehicle of claim 1, further comprising:
    radial ridges extending radially from the wheel panel or the inner panel.

6. A splash and spray suppressor for a wheeled motor vehicle comprising:
    a fender having an inner arched wall and an arched outer sidewall extending radially from the arched wall toward a wheel, the arched wall and outer sidewall defining a wheel well;
    an arched wheel panel nesting within the fender, the wheel panel having a plurality of apertures, and an arched rim at the side extending radially toward the wheel;
    a gap in fluid communication with the apertures and being located between the wheel panel and the fender;
    an opening in fluid communication with the gap and being located between the wheel panel and the fender, the opening allowing fluid drainage from the splash and spray suppressor; and
    an angled deflector extending radially from the wheel panel toward the wheel.

7. A splash and spray suppressor for a wheeled motor vehicle comprising:
    a fender having an inner arched wall and an arched outer sidewall extending radially from the arched wall toward a wheel, the arched wall and outer sidewall defining a wheel well;
    an arched wheel panel nesting within the fender, the wheel panel having a plurality of apertures, and an arched rim at the side extending radially toward the wheel;
    a gap in fluid communication with the apertures and being located between the wheel panel and the fender;
    an opening in fluid communication with the gap and being located between the wheel panel and the fender, the opening allowing fluid drainage from the splash and spray suppressor;
    an angled deflector extending radially from the wheel panel toward the wheel;
    an arched inner panel nesting between the wheel panel and the fender and having an arched side portion extending radially toward the wheel, the side portion fitting between the sidewall and the rim; and
    the inner panel attaching to the wheel panel and laterally sealing the wheel panel.

8. A splash and spray suppressor for a wheeled motor vehicle of claim 7, further comprising:
    apertures in the inner panel;
    a second gap in fluid communication with the apertures in the wheel panel and inner panel and being located between the inner panel and the fender; and
    a second opening in fluid communication with the second gap and allowing fluid drainage from the splash and spray suppressor.

9. A splash and spray suppressor for a wheeled motor vehicle of claim 8, wherein the inner panel mounts to the inner wall of the fender.

10. A splash and spray suppressor for a wheeled motor vehicle of claim 7, further comprising:
    an arched fender panel, the fender panel having an arched side flange extending radially toward the tire, the fender panel nesting between the first inner panel and the fender and being mounted to the inner wall of the fender.

11. A splash and spray suppressor for a wheeled motor vehicle of claim 8, further comprising:
    channels being located within at least one gap and in fluid communication with the apertures and the opening.

12. A splash and spray suppressor for a wheeled motor vehicle of claim 8, further comprising:
    radial ridges extending radially from one of the panels.

* * * * *